United States Patent [19]

Mizumoto et al.

[11] Patent Number: 5,765,064
[45] Date of Patent: Jun. 9, 1998

[54] CAMERA USING FILM WITH MAGNETIC TRACK

[75] Inventors: Kenji Mizumoto, Osaka; Yasuaki Serita, Sakai; Satoshi Hamada, Habikino, all of Japan

[73] Assignee: Minolta Co., Ltd., Osaka, Japan

[21] Appl. No.: 787,755

[22] Filed: Jan. 28, 1997

[30] Foreign Application Priority Data

Jan. 31, 1996 [JP] Japan .................... 8-014978

[51] Int. Cl.$^6$ .................................. G03B 17/24
[52] U.S. Cl. ............................ 396/389; 396/390
[58] Field of Search .................... 396/310, 311, 396/319, 320, 389, 390

[56] References Cited

U.S. PATENT DOCUMENTS

| | | | |
|---|---|---|---|
| 5,017,326 | 5/1991 | Wash et al. | 396/319 |
| 5,432,570 | 7/1995 | Ueda et al. | 395/310 |
| 5,519,462 | 5/1996 | Spencer et al. | 396/319 |
| 5,614,969 | 3/1997 | Hukawa | 396/319 |
| 5,617,161 | 4/1997 | Sorita et al. | 396/319 |

FOREIGN PATENT DOCUMENTS

5-80401  4/1993  Japan ..

Primary Examiner—Safet Metjahic
Assistant Examiner—Nicholas J. Tuccillo
Attorney, Agent, or Firm—Sidley & Austin

[57] ABSTRACT

A camera (100), suitable for using photographic film (18) with a magnetic track (33), includes a transporting mechanism (M, 22) for transporting the film along a film transport path, a magnetic head (11) positioned adjacent the film transport path so as to read information magnetically recorded on an adjacent portion of the magnetic track, signal processing circuits (12, 42) to provide a digital output signal responsive to thus read information, and a microcomputer (13) for comparing a digital output signal to predetermined threshold levels in order to determine whether or not information is recorded on the portion of the magnetic track being read by the magnetic head and for setting the threshold values. The threshold levels can be set in accordance with a level of the digital output signal when magnetically recorded information is not being read by the magnetic head, e.g., before the film is fed or during the feeding of the film before the first frame reaches the magnetic head. The camera can also include a detector (45) for detecting information (27) indicative of the type of film in the camera and the threshold levels can be set in accordance with the type of film detected by the detector. The threshold levels can be upper and lower threshold values centered on a predetermined value.

20 Claims, 8 Drawing Sheets

Normal Signal Condition

Fig. 2 B (PRIOR ART)

Reduced Output

Fig. 3 A (PRIOR ART)

Normal

Fig. 3 B (PRIOR ART)

Abnormal

Fig. 4 A
(PRIOR ART)

Negative Film

Fig. 4 B
(PRIOR ART)

Positive Film

CAMERA USING FILM WITH MAGNETIC TRACK

FIELD OF THE INVENTION

The present invention relates to a camera which is suitable for using photographic film which is provided with a magnetic track.

DESCRIPTION OF THE RELATED ART

Figure 1:
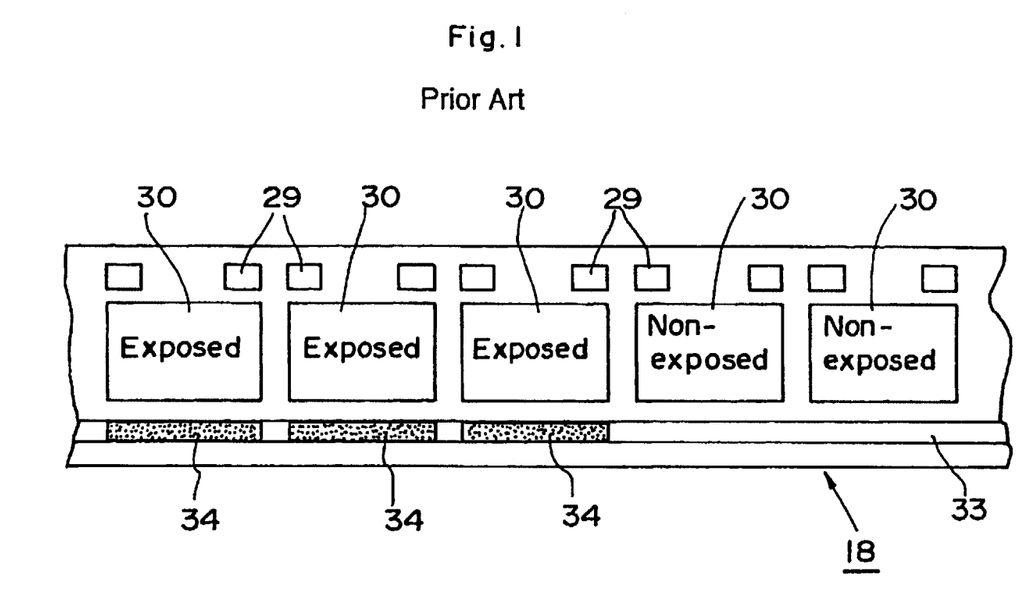
FIG. 1 is a plan view of a conventional photographic film having a magnetic track.

Photographic film with magnetic information recordings, have been proposed heretofore. FIG. 1 shows the essential parts of such a photographic film 18. The photographic film 18 includes a plurality of individual frames 30, a magnetic track 33, and a plurality of perforations 29. The magnetic track 33 can comprise a continuous magnetic layer which extends at least generally parallel to the longitudinal axis of the film 18 and is located in a first longitudinally extending side margin of the film 18 between the bottom edge of the frames 30 and the bottom edge of the film 18, as viewed in FIG. 1. The perforations 29 are provided in a second longitudinally extending side margin of the film 18 between the top of the frames 30 and the top edge of the film 18, as viewed in FIG. 1. A first perforation 29 is provided at each position corresponding to the beginning part of an individual frame 30, and a second perforation 29 is provided at each position corresponding to the end part of an individual frame 30. When a frame 30 is photographically exposed, magnetic information 34, expressing the photographic conditions related to the exposure of that frame 30, is written by a magnetic head onto the portion of the magnetic track 33 corresponding to that exposed frame 30.

In cameras which use the described type of photographic film, a magnetic head is provided to write the magnetic information 34 onto the magnetic track 33, and to read the magnetically recorded information 34 from the magnetic track 33. Since magnetic information 34 is written on each portion of the magnetic track 33 corresponding to a photographically exposed frame 30, it can be determined whether or not a particular frame 30 has been photographically exposed, by determining whether or not any magnetic information 34 is written on the corresponding portion of the magnetic track 33. Thus, the transporting of the film 18 within the camera can be controlled, and the unexposed film can be started in the camera by determining whether or not a frame has been exposed.

Figure 2:
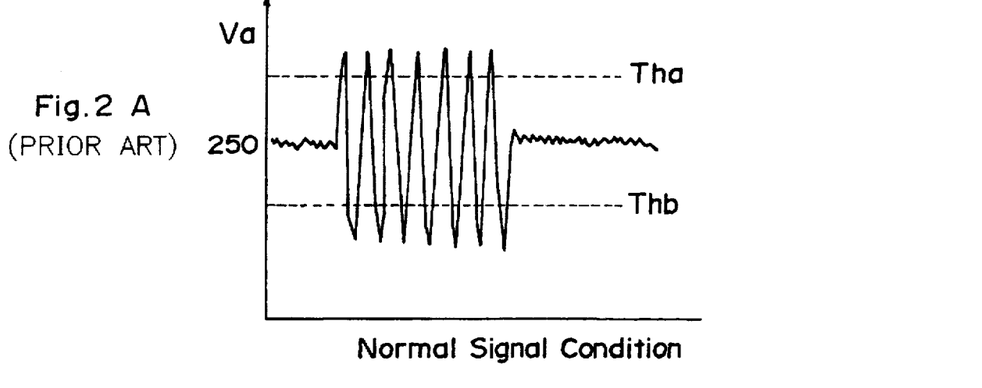

The magnetic material, forming the magnetic track 33 on the film 18, has a low density, which is a problem in that the magnetic information writing/reading conditions in the camera are inferior to those for audio magnetic cassette tape. This problem is described hereinafter with reference to FIGS. 2A and 2B. FIGS. 2A and 2B show the condition of magnetic output signals Va when the magnetic track 33 of the film 18 is read by a magnetic head. FIG. 2A shows a magnetic analog output signal under normal conditions, while FIG. 2B shows a magnetic analog output signal Va having a reduced amplitude range. In FIGS. 2A and 2B, the areas where the analog output signal has a high amplitude range indicate the presence of magnetic information written on the portion of the magnetic track 33 which is being read, and the areas of low amplitude range indicate the absence of magnetic information 34 on the portion of the magnetic track 33 being read.

Conventionally, a determination of the presence/absence of magnetic information 34 is accomplished by comparing the magnetic analog output signal to fixed upper and lower threshold values Tha and Thb. However, as shown in FIG. 2B, there are occasions when errors and environmental fluctuations of temperature, humidity, the passage of time, etc., result in a determination that no magnetic information is written on the particular portion of the magnetic track 33 being read, because the magnetic analog output signal Va does not reach the threshold values Tha and Thb, despite the fact that magnetic information 34 is actually written on that portion of the magnetic track 33.

Figure 3:
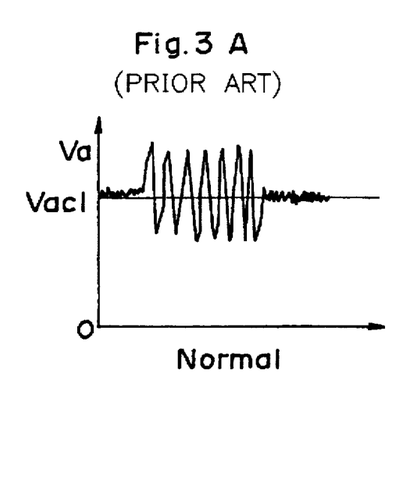
FIGS. 3A and 3B illustrate a recognition problem which occurs with conventional methods in that FIG. 3A shows a normal magnetic output signal and FIG. 3B shows an abnormal magnetic output signal.

FIGS. 3A and 3B show another example of recognition error. Normally, the magnetic analog output signal Va has a predetermined amplitude range centered on Vac1, as shown in FIG. 3A, but at abnormal times the center of this amplitude range can be shifted by an amount to Vac2, as shown in FIG. 3B.

Figure 4A:
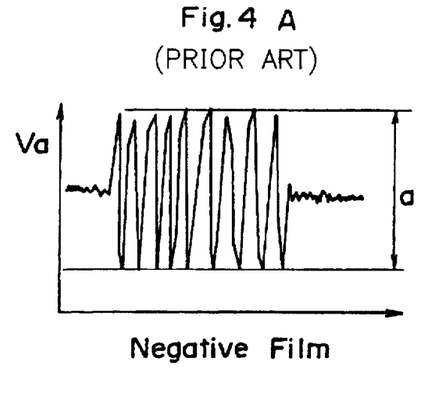
Figure 4B:
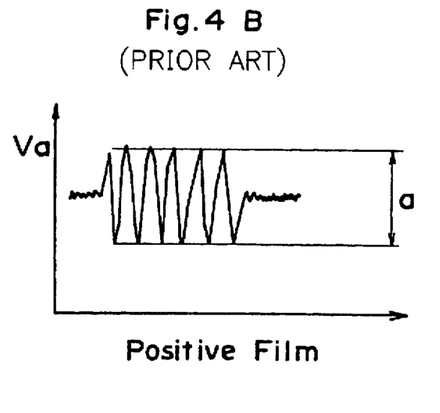
FIG. 4B shows a magnetic output signal for a negative film.

FIGS. 4A and 4B show another example of recognition error. These drawings show examples wherein the amplitude range is shifted as a result of a change in the type of film being used. In the case of a negative film, shown in FIG. 4A, the amplitude range "a" is larger than the amplitude range "a" of a positive film shown in FIG. 4B. Therefore, when the upper and lower threshold levels are fixed, a recognition error can be produced by the type of film being used in the camera being different from the type of film on which the fixed threshold levels were based.

Figure 5:
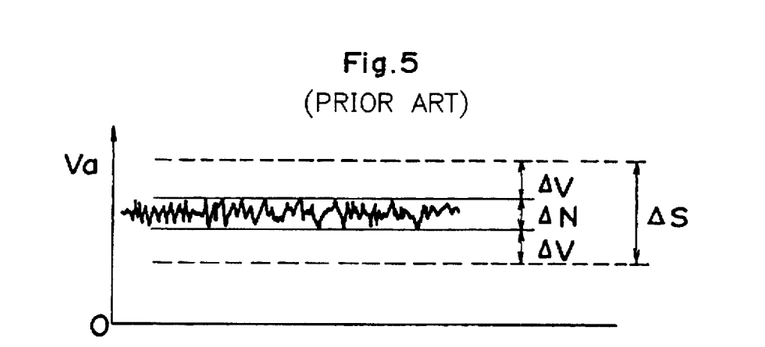
FIG. 5 illustrates a recognition problem which occurs with conventional methods due to variations in noise level.

FIG. 5 shows another example of recognition error. When a predetermined noise level $\Delta N$ is present in the circuit for processing the magnetic analog output signals Va, there is a possibility that the noise level $\Delta N$ will change due to error or environmental fluctuation. Accordingly, this fluctuation in the noise level results in recognition errors when the threshold level difference $\Delta S$ is fixed at $\Delta S = \Delta N + 2\Delta V$.

SUMMARY OF THE INVENTION

An object of the present invention is to eliminate the previously described disadvantages by providing a method for adjustably setting the threshold levels for determining the presence/absence of the magnetic information on the magnetic track, and for minimizing the adverse effects of noise levels and changes in the output level of magnetic analog output signals.

The present invention is a camera, which is suitable for using photographic film having a magnetic track, and includes a transporting mechanism for transporting a film along a film transport path within the camera, a magnetic head positioned adjacent the film transport path so as to read/write information on an adjacent portion of a magnetic track of the film and to provide an output signal responsive to thus read information, a comparator/setter device for comparing an output signal from the magnetic head to predetermined threshold levels in order to determine whether or not information is recorded on the portion of the magnetic track being read by the magnetic head, and for adjustably setting the threshold values.

The comparator/setter device can adjustably set the threshold levels in accordance with a level of the output signal when magnetically recorded information is not being read by the magnetic head, e.g., either before the film is fed or during the feeding of the film before the first frame of the film reaches the magnetic head.

The camera can also include a detector for detecting information indicative of the type of film in the camera, and the comparator/setter device can adjustably set the threshold levels in accordance with the type of film detected by the detector.

BRIEF DESCRIPTION OF THE DRAWINGS

FIGS. 2A and 2B illustrate a recognition problem which occurs with conventional methods in that FIG. 2A shows a normal output signal while FIG. 2B shows a reduced output signal;

FIGS. 4A and 4B illustrate a recognition problem which occurs with conventional methods in that FIG. 4A shows a magnetic output signal for a positive film while

DESCRIPTION OF THE PREFERRED EMBODIMENTS

Embodiments of the present invention are described hereinafter with reference to the accompanying drawings.

Figure 6:
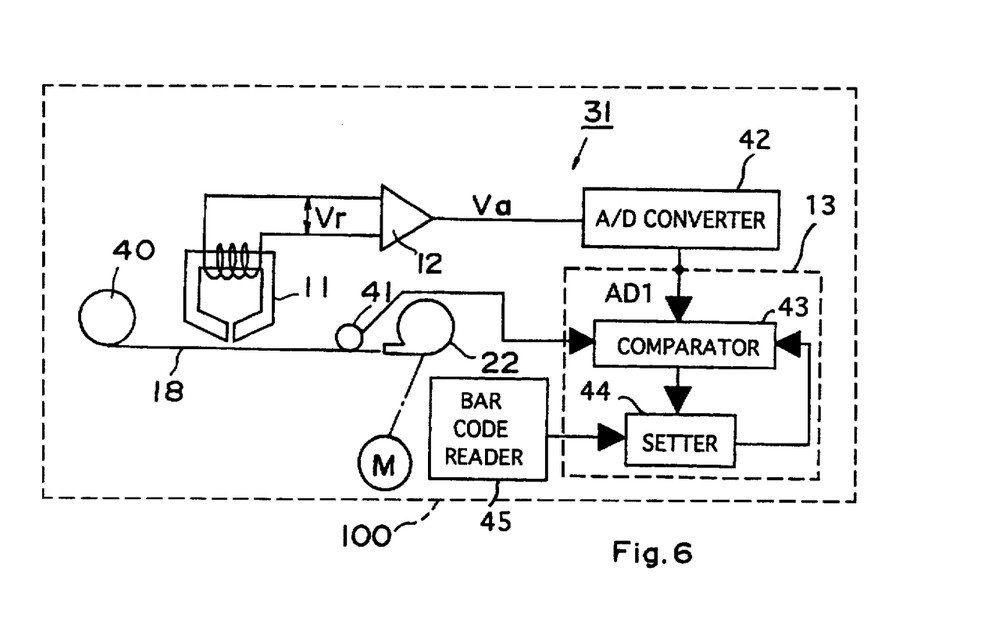
FIG. 6 shows a magnetic signal processing device in accordance with the present invention.

FIG. 6 shows components of a magnetic information reading/writing unit incorporated in a camera 100. The photographic film 18 is initially accommodated in a film cartridge 22, and the film 18 is moved from the film cartridge 22, via the drive of the film feed motor M, and is wound upon the takeup spool 40. Thus, the film feed motor M and the takeup spool 40 constitute a film transport mechanism which is an integral part of the camera 100. A detection roller 41 is arranged adjacent to the film transport path so as to be in contact with the film 18 as the film 18 moves from the cartridge 22 to the spool 40, such that the roller 41 is rotationally driven by the moving film 18. The detection roller 41 generates a pulse signal in accordance with the amount of its rotation. The magnetic information reading/writing unit 31 includes a reading magnetic head 11, a magnetic signal processing circuit 12, an analog-to-digital converter 42, and a microcomputer 13. The unit 31 is for writing magnetic information 34 onto the magnetic track 33 on the film 18 and for reading any magnetic information 34 previously recorded on the magnetic track 33 on the film 18. The magnetic signal processing circuit 12 is connected to the magnetic reading head 11 in order to process the magnetic information 34 which is read from the magnetic track 33. The microcomputer 13 is connected to the magnetic signal processing circuit 12 in order to analyze the thus processed magnetic signals.

The magnetic track 33, on which is written the magnetic information 34, is moved parallel to the longitudinal axis of the film 18, via the transporting of the film 18, while being pressed against the gap of the magnetic reading head 11. Thus, a regenerated signal voltage Vr is generated by magnetic induction at the bilateral coil ends of the magnetic reading head 11. The magnetic signal processing circuit 12 amplifies the regenerated signal voltage Vr to a standard voltage level, which it then outputs as a magnetic output signal Va.

When magnetic information 34 is recorded on the portion of the magnetic track 33 of film 18 which is being read, the magnetic output signal Va will generally have a value within an output range of 0 to 5 V, with an amplitude center point of 2.5 V. Typically, a signal of 2.5±0.4 V is outputted. This output signal differs depending on the type of film, and the stated value is the value for a positive film. The magnetic output signal Va is transmitted to the input of analog-to-digital converter 42, wherein the analog signal Va is subjected to analog-to-digital (A/D) conversion. The A/D conversion characteristics of the analog-to-digital converter 42 are such that analog signals in the range of 0 to 5 V are converted to 8 bits (256 levels). Therefore, the resolution is 0.02 V. Thus, the magnetic output signal Va is subjected to A/D conversion to obtain digital signals having the range±21 levels centered on 128th level. The resulting digital output signal is then applied to the input pin AD1 of the microcomputer 13. The microcomputer comprises a comparator 43 and a setter 44.

FIRST EMBODIMENT

A method for determining whether or not magnetic information 34 is present on the portion of the magnetic track 33 being read is described below.

Figure 7:
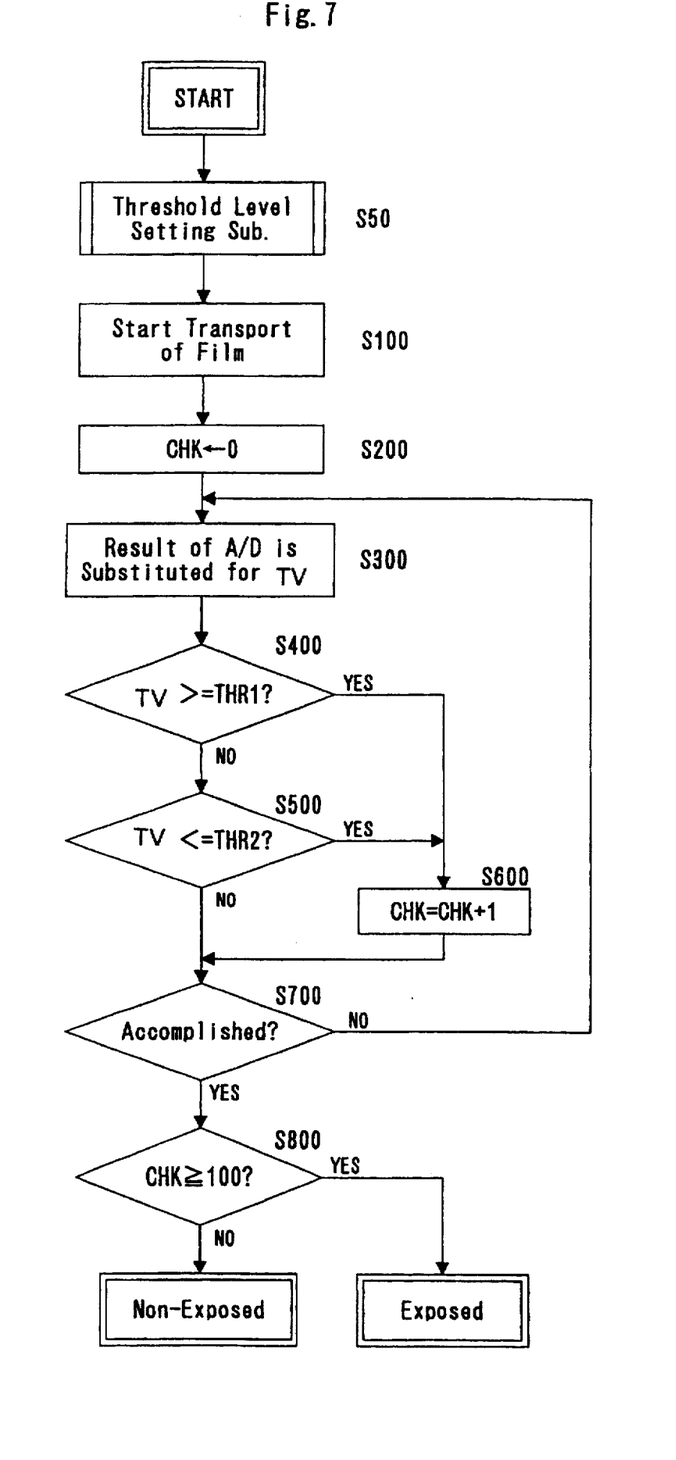
FIG. 7 is a flow chart of a process, in accordance with the present invention, for determining whether or not magnetic information is recorded on the film.

FIG. 7 is a flow chart showing a sequence of steps executed by the microcomputer 13 and involving the comparator 43 within the microcomputer 13. After the threshold level setting subroutine (described in detail later) is executed (step S50), the transporting of the film 18 is initiated (step S100). Then, the value of a counter CHK, for counting the values exceeding the threshold level, is reset to zero (step S200). When a frame 30 of the film arrives at the magnetic reading head 11, the operation of reading the magnetic information 33 for that frame starts, and the result of the A/D conversion is substituted for a temporary variable, TV (step S300).

When the value of the temporary variable TV is equal to or greater than the upper limit threshold THR1 or is equal to or less than the lower limit threshold THR2, as set by the process of the preceding step S50, the value on the counter CHK is incremented by one (steps S400 to S600).

The processes of steps S400 to S600 are repeated a plurality of times during the transporting of a single frame 30 of the film 18 past the magnetic reading head 11, i.e., during the time it takes for the magnetic track segment (22 mm) comprising the magnetic information 34 for that frame 30 to pass the magnetic reading head 11 (step S700). The detection roller 41 provides a signal to the comparator 43 for a determination of whether or not the movement of a magnetic track segment comprising magnetic information 34 for a particular frame 30 has passed the reading head 11.

If the count value of counter CHK is 100 or higher during the passage of a single frame, the presence of a magnetic signal is determined by the comparator 43 (step S800). That is, if the number, of the TV values which exceed the threshold values, is 100 or higher, the presence of magnetic information (i.e., an exposed frame) for a frame 30 is determined. If the value of the counter CHK is less than 100 for a single frame 30, the signals are determined to be noise and not magnetic signals (i.e., an unexposed frame) regardless of the occurrence of some TV values exceeding the threshold values for that frame 30.

Figure 8:
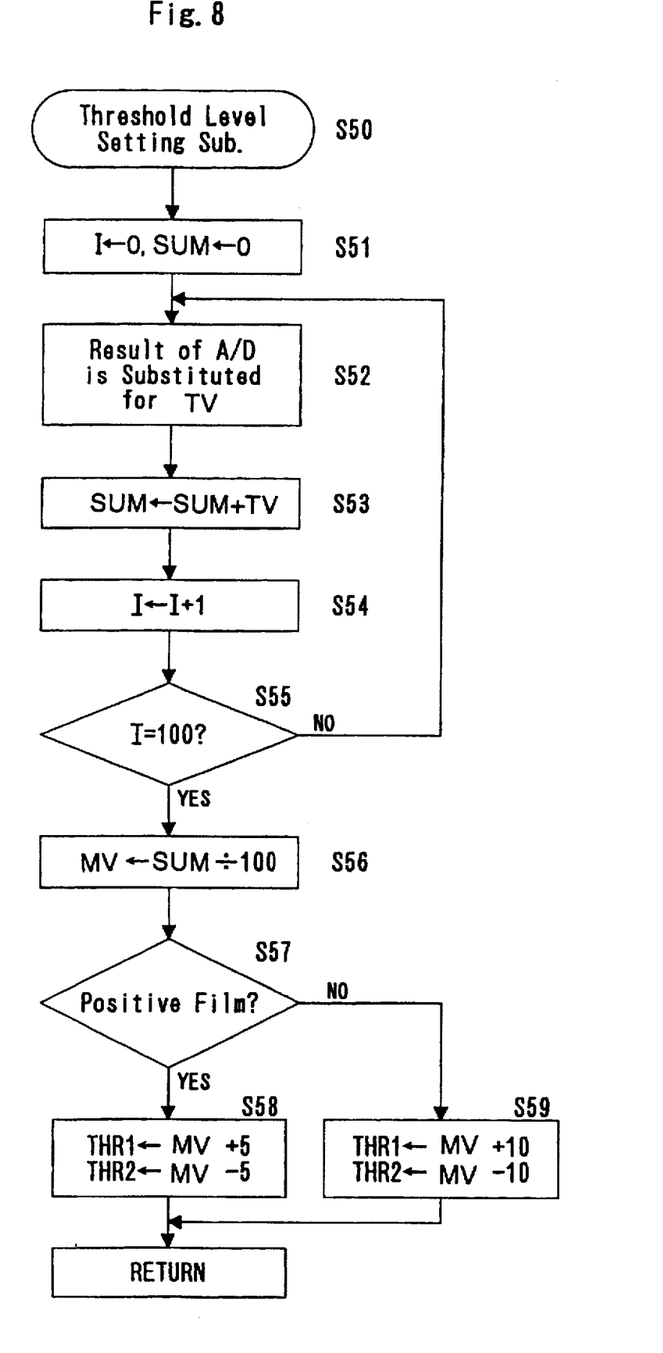
FIG. 8 is a flow chart showing a sequence for adjustably setting the threshold levels in a first embodiment of the invention.

FIG. 8 is a flow chart showing a detailed sequence of the threshold level setting subroutine of step S50 of FIG. 7, which involves the setter 44 within the microcomputer 13. As can be clearly understood from the previous description of FIG. 7, the process of FIG. 8 is executed before the film transporting step S100. Accordingly, the process of FIG. 8 is executed before the arrival of the film 18 at the magnetic reading head 11, i.e., when the magnetic track 33 is not opposite the magnetic reading head 11. This arrangement is to determine the amplitude center of only the circuit noise of the magnetic signal processing circuit 12 (i.e., the output of the magnetic signal processing circuit 12 when there is no magnetic signal at the magnetic reading head 11). The thus determined amplitude center of the noise is then used as the center for setting the threshold levels according to the type of film.

First, the variables I and SUM, used in subsequent steps, are set at initial values of zero (step S51). Then, the magnetic output signal Va, outputted from the magnetic signal processing circuit 12, is subjected to A/D conversion in analog to digital convertor 42 and then inputted to microcomputer 13 as digital data. This subroutine is executed 100 times, and the mean value for the 100 samples is substituted for the MV value as the amplitude center (steps S52 through S56). This sampling operation is executed before the film 18 is transported from the film cartridge 22, i.e., when the magnetic track 33 is not opposite the magnetic reading head 11. Since this sampling occurs with film 18 in a stopped state, i.e., with the film transport motor M stopped, the noise caused by the driving of the film transport motor M is eliminated from the sampled output signal such that the sampled output signal expresses only the circuit noise of the magnetic signal processing circuit 12.

The specific sequence entails the A/D conversion of the thus read signals, and transmitting the resulting digital signals to the microcomputer 13 to set the TV value (step S52). Then, the calculated TV value is added to the variable SUM (step S53); and the variable I, expressing the number of samples, is incremented by one (step S54). When the variable I reaches 100, i.e., after 100 cycles of the processes of steps S52 through S54, the mean value for the 100 samples is substituted for the variable MV (steps S55 and S56).

Next, the threshold levels are changed according to the film type. In the case of a positive film (step S57: YES), an amplitude range of ±5 (±100 mV) is used to set the threshold levels; whereas, otherwise (step S57: NO) an amplitude range of ±10 (±200 mV) is used to set the threshold levels which are substituted for the threshold levels THR1 and THR2 by the setter 44.

Figure 9:
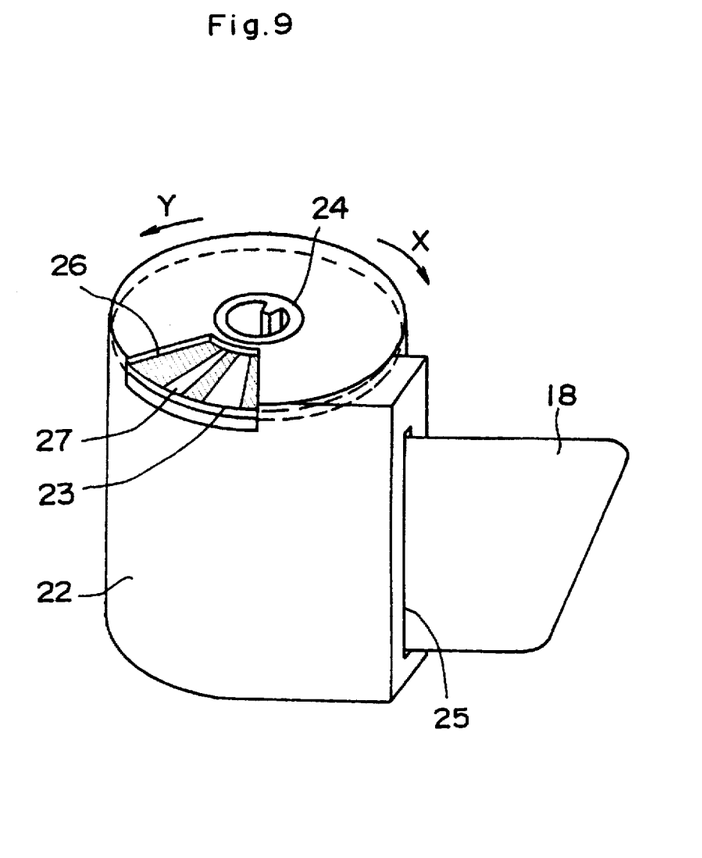
FIG. 9 is a perspective view of a film cartridge.

The method for detecting the type of film in step S57 is described hereinafter. FIG. 9 is a perspective view of a film cartridge 22. When the film cartridge 22 is initially positioned in the camera, the film 18 is fully wound, i.e., completely contained within the film cartridge 22 except for the leading tab. When the spool 24 is rotated in the Y direction, as represented by the arrow Y in the Figure, the film 18 is fed out through the film outlet 25 of the film cartridge 22. When the spool 24 is rotated in the X direction, as represented by the arrow X in the figure, the film 18 is wound up within the film cartridge 22. A data disk 23 is provided integrally with the spool 24, such that when the spool 24 is rotated, the data disk 23 also rotates in conjunction therewith. A part of the data disk 23 is exposed to the exterior of the film cartridge 22 via an opening 26 in one end of the film cartridge 22. A bar code 27 is printed on the top of the data disk 23. When the opening 26 is placed opposite a bar code reader 45, e.g., a photoreflector, the camera 100 can read the bar code 27 on the data disk 23 during rotation of the spool 24. The film type (color or black and white, negative or positive, etc.), the film sensitivity, and the number of frames are encoded and recorded in the bar code 27. The camera 100 detects the film type by the photoreflector 45 reading this bar code 27 and supplying a signal representative of the thus read bar code to the setter 44 within the microcomputer 13.

SECOND EMBODIMENT

Figure 10:
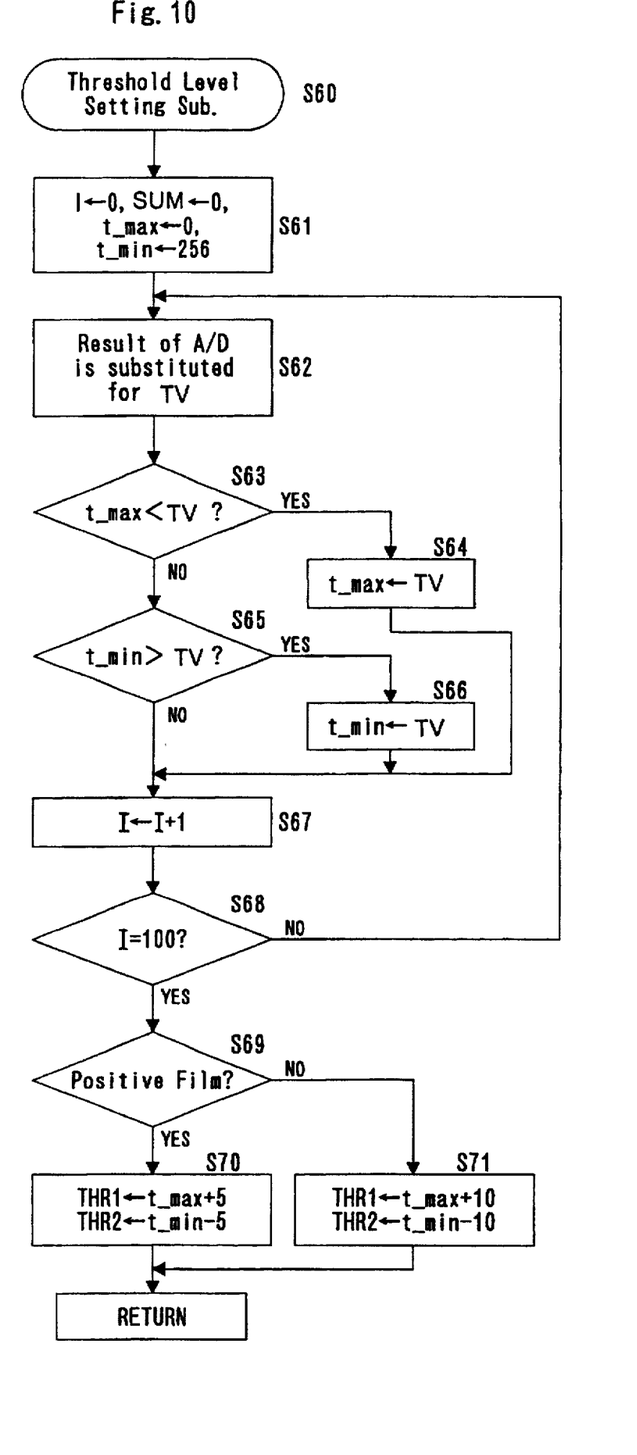
FIG. 10 is a flow chart showing a method for adjustably setting the threshold levels in a second embodiment of the invention.

FIG. 10 is a flow chart showing another embodiment of the threshold level setting subroutine of step S50 of FIG. 7. In this second embodiment, the process of FIG. 10 is substituted for the process of the first embodiment, shown in FIG. 8.

In the second embodiment, the process of FIG. 10 is also executed before the film transporting step S100, as previously described in the first embodiment. Accordingly, the process of FIG. 10 is executed before the film 18 reaches the magnetic reading head 11, i.e., when the magnetic track 33 is not opposite the magnetic reading head 11. Thus, the threshold values are determined by the setter 44 based on the output signal under conditions of only circuit noise in the magnetic signal processing circuit 12, similar to the first embodiment.

Referring to FIG. 10, the various variables used in the subsequent processing are first set at initial values (step S61). Then, the magnetic output signal Va, outputted from the magnetic signal processing circuit 12, is subjected to A/D conversion in analog to digital convertor 42, and the resulting digital signals are inputted to the microcomputer 13 as digital data. This subroutine is executed 100 times, and the maximum value and the minimum value are calculated and substituted for the variables t-max and t-min (steps S62 through S68). This sampling operation is executed before the film 18 is transported from the film cartridge 22, i.e., when the magnetic track 33 is not opposite the magnetic reading head 11. Since this sampling occurs with the film 18 in a stopped state, i.e., with the film transport motor M stopped, the noise caused by the driving of the film transport motor M is eliminated from the sampled output signal such that the sampled output signal expresses only the circuit noise of the magnetic signal processing circuit 12.

Although the maximum and minimum noise levels are established in this process, alternatively, the maximum values and the minimum values can be measured a number of times and the mean value of the samples determined in order to set the noise level.

Then, the upper and lower threshold levels THR1 and THR2 are set according to the film type (step S69 through S71). At this time, a predetermined value in accordance with the film type is added to or subtracted from the aforesaid maximum and minimum values obtained above. This predetermined value can be freely set.

THIRD EMBODIMENT

A third embodiment concerns the noise generated by the film transport motor M when the film 18 is being transported. In the third embodiment, the processing sequence shown in the flow chart of FIG. 11 is substituted for the processing sequence of the flow chart shown in FIG. 7 of the first embodiment.

Figure 11:
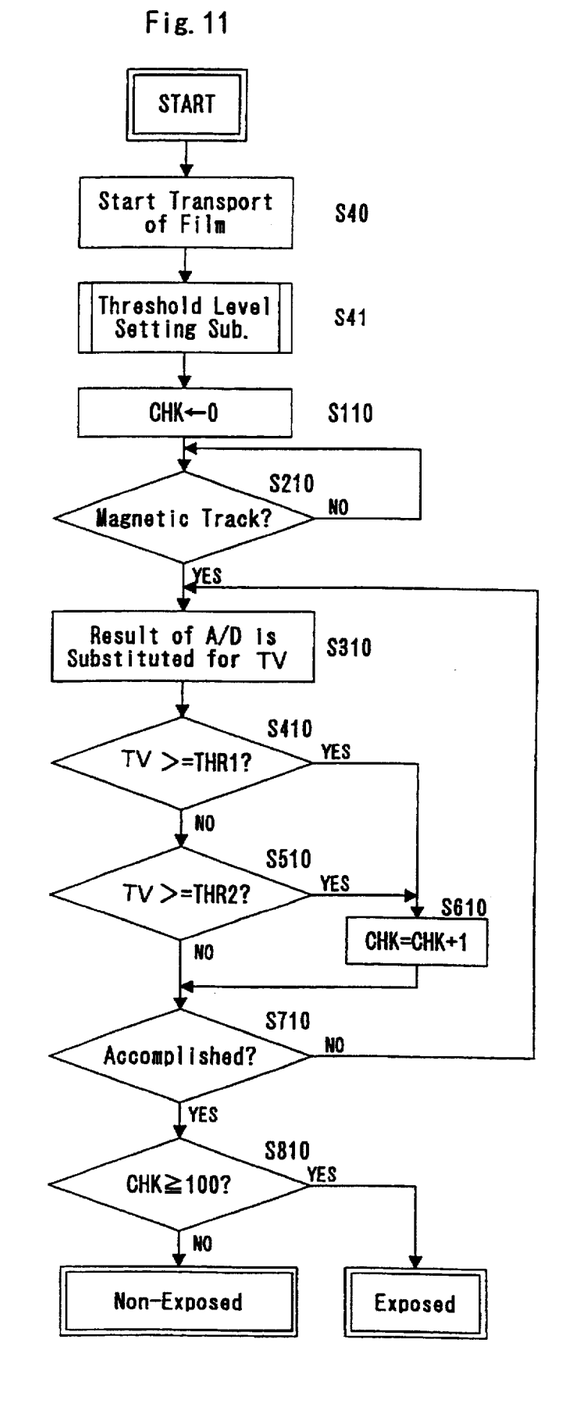
FIG. 11 is a flow chart of a process for determining whether or not magnetic information is recorded on the film in a third embodiment of the invention.

Referring to FIG. 11, first the transporting of the film 18 is started (step S40). Then, the threshold level setting subroutine is executed (step S41). Either the process shown in FIG. 8 or the process shown in FIG. 10 can be used as the threshold level setting subroutine (step S41). In the third embodiment, unlike the first and second embodiments, noise samples are measured 100 times, using either the process of FIG. 8 or the process of FIG. 10, while the film 18 is being transported, because the threshold level setting subroutine is executed after the film transporting has been started, and then the upper limit and lower limit threshold values THR1 and THR2 are set. On this point, the third embodiment differs from the first and second embodiments.

Although the aforesaid sampling occurs while the film 18 is being transported and either before the film 18 reaches the magnetic reading head 11 or after the film 18 reaches the magnetic reading head 11, such sampling is accomplished with a portion of the magnetic track 33, which is located at the leading end of the film 18 and which does not have magnetic information recorded thereon, disposed adjacent the magnetic reading head 11.

Then, the counter CHK, which counts the values exceeding the threshold values, is reset to zero (step S110). When the film 18 is transported and arrives at the magnetic reading head 11, the magnetic track 33 corresponding to the frame is read, the data are subjected to A/D conversion and the result is substituted for the TV value (step S310).

When the value of TV exceeds or is equal to the upper limit value THR1 or is less than the or equal to lower limit value THR2 of the thresholds set in the process of the previous step S610, the counter CHK is incremented by one (steps S410 through S610).

The processes of steps S310 through S610 are repeated during the transporting of a single frame 30 of the film 18, i.e., of a magnetic track segment (22 mm) comprising the magnetic information 34 for that frame 30 (step S710). The detection roller 41 provides a signal to determine whether or not the transporting of a magnetic track segment, comprising magnetic information 34 for a particular single frame 30, has been accomplished.

If the count value of the counter CHK is 100 or higher for a single frame 30, a magnetic signal is determined to be present (step S810). That is, if the number of TV values exceeding the threshold values for a single frame is 100 or higher, magnetic information (i.e., an exposed frame) is determined to be present. Otherwise, if the value of the counter CHK is less than 100 for a single frame, the signals are determined to be noise and not magnetic signals (i.e., an unexposed frame), regardless of the occurrence of some TV values exceeding the threshold values for that frame.

As described above, in the third embodiment the threshold levels are set by the setter portion 44 of the microcomputer 13 in accordance with the output of the magnetic signal processing circuit 12 when magnetic information is not present, i.e., in accordance with the noise within the circuit, such that the recognition errors produced by conventional methods using fixed threshold values do not occur.

Furthermore, discrimination accuracy is improved in the third embodiment because the threshold values are set with regard to noise produced by the driving of the film transport motor.

Although, in the previously described embodiments the threshold values are set by sampling either when the magnetic track 33 is not opposite the magnetic reading head 11 or when a portion of the magnetic track 33 at the leading end of the film 18 is opposite the magnetic head 11 but does not contain any recorded magnetic information, the present invention is not limited to these embodiments. For example, the sampling can be accomplished while the portion of the magnetic track 33, which is opposite the magnetic head 11, is part of the space between two adjacent frames. In the present invention, the sampling is accomplished when no recorded magnetic information is opposite the magnetic head 11.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

We claim:

What is claimed is:

1. A camera which is suitable for using photographic film having a magnetic track and at least one frame, said camera comprising:

a transporting mechanism for transporting a film along a film transport path;

a magnetic head positioned adjacent the film transport path so as to read information magnetically recorded on a magnetic track of a film having a magnetic track and to provide an output signal responsive to thus read information; and a device for comparing an output signal, which is responsive to thus read information, to a predetermined threshold level in order to determine whether or not information is recorded on the portion of the magnetic track being read by said magnetic head, and for setting said threshold level prior to initiating said transporting mechanism, in accordance with a level of the output signal when magnetically recorded information is not being read by said magnetic head.

2. A camera in accordance with claim 1, further comprising an amplification circuit, which amplifies an output signal from said magnetic head to provide an amplified output signal, and an analog-to-digital converter, to convert the amplified output signal to a digital output signal; wherein said device compares said digital output signal to said predetermined threshold level in order to determine whether or not information is recorded on the portion of the magnetic track being read by said magnetic head.

3. A camera in accordance with claim 1, further comprising a detector for providing a signal to said device in order to determine whether or not a movement of a segment of said magnetic track, comprising magnetic information for a particular frame of said film, past said magnetic head has been accomplished.

4. A camera in accordance with claim 3, wherein said device comprises a microcomputer.

5. A camera in accordance with claim 1, wherein said device sets upper and lower threshold values centered on said predetermined level.

6. A camera in accordance with claim 1, wherein said device sets the threshold level in accordance with a level of the output signal when said magnetic head does not confront a magnetic track.

7. A camera in accordance with claim 1, wherein said device sets the threshold level during a transporting of a film by the transporting mechanism.

8. A camera in accordance with claim 7, wherein the device sets the threshold level during a transporting of a film by the transporting mechanism before the film reaches said magnetic head.

9. A camera in accordance with claim 7, wherein the device sets the threshold level during a transporting of a film by the transporting mechanism and in accordance with a level of the output signal when the portion of the magnetic track confronting said magnetic head is located at a leading end of said film prior to a first frame of said film.

10. A camera in accordance with claim 5, further comprising a detector for detecting information indicative of a type of a film in the camera, and wherein said device changes the threshold values in accordance with the type of film detected by said detector.

11. A camera in accordance with claim 1, wherein said device comprises a microcomputer.

12. A camera which is suitable for using photographic film having a magnetic track and at least one frame, said camera comprising:

a transporting mechanism for transporting a film along a film transport path;

a magnetic head positioned adjacent the film transport path so as to read information magnetically recorded on a magnetic track of a film having a magnetic track and to provide an output signal responsive to thus read information;

a detector for detecting information indicative of a type of a film in the camera; and a device for comparing the output signal to a predetermined threshold value in order to determine whether or not information is recorded on the portion of the magnetic track being read by said magnetic head, and for setting the threshold value in accordance with the type of film detected by said detector.

13. A camera in accordance with claim 12, further comprising an amplification circuit, which amplifies an output signal from said magnetic head to provide an amplified output signal, and an analog-to-digital converter, to convert the amplified output signal to a digital output signal; wherein said device compares said digital output signal to said predetermined threshold value in order to determine whether or not information is recorded on the portion of the magnetic track being read by said magnetic head.

14. A camera in accordance with claim 13, wherein said device comprises a microcomputer.

15. A camera in accordance with claim 12, further comprising a detector for providing a signal to said device in order to determine whether or not a movement of a segment of said magnetic track, comprising magnetic information for a particular frame of said film, past said magnetic head has been accomplished.

16. A camera in accordance with claim 12, wherein said device sets upper and lower threshold values centered on a predetermined level.

17. A camera in accordance with claim 12, wherein said device determines a reference value via a level of an output signal from said magnetic head when said magnetic head does not confront a magnetic track, and sets the threshold value by correcting said reference value in accordance with the type of film detected by said detector.

18. A camera in accordance with claim 12, wherein said device sets the threshold value for a film before the film is transported by the transporting mechanism.

19. A camera in accordance with claim 12, wherein said device sets the threshold value during a transporting of a film by the transporting mechanism.

20. A camera in accordance with claim 12, wherein said device sets the threshold value during a transporting of a film by the transporting mechanism and before the film reaches said magnetic head.

* * * * *